(12) United States Patent
Wada et al.

(10) Patent No.: US 10,012,738 B2
(45) Date of Patent: Jul. 3, 2018

(54) POSITIONING METHOD AND POSITIONING APPARATUS USING SATELLITE POSITIONING SYSTEM

(71) Applicants: Hitachi Zosen Corporation, Osaka-shi, Osaka (JP); GPS Solutions, Inc., Boulder, CO (US)

(72) Inventors: Akira Wada, Osaka (JP); Hirotaka Obata, Osaka (JP); Leos Mervart, Prague (CZ); Christian Rocken, Longmont, CO (US); Zdenek Lukes, Prague (CZ); Tetsuya Iwabuchi, Louisville, CO (US)

(73) Assignees: Hitachi Zosen Corporation, Osaka (JP); GPS Solutions, Inc., Boulder, CO (US)

( * ) Notice: Subject to any disclaimer, the term of this patent is extended or adjusted under 35 U.S.C. 154(b) by 313 days.

(21) Appl. No.: 15/079,908

(22) Filed: Mar. 24, 2016

(65) Prior Publication Data
US 2017/0276800 A1    Sep. 28, 2017

(51) Int. Cl.
*G01S 19/44* (2010.01)
*G01S 19/38* (2010.01)
*G01S 19/07* (2010.01)

(52) U.S. Cl.
CPC .............. *G01S 19/44* (2013.01); *G01S 19/07* (2013.01)

(58) Field of Classification Search
CPC ........... G01S 19/43; G01S 19/44; G01S 19/55
USPC ............ 342/357.21, 357.24, 357.25, 357.27, 342/357.38; 701/469, 470
See application file for complete search history.

(56) References Cited

U.S. PATENT DOCUMENTS

2010/0245168 A1* 9/2010 Rollet ..................... G01S 19/21
                                                           342/357.23
2017/0307761 A1* 10/2017 Scot ......................... G01S 19/25

FOREIGN PATENT DOCUMENTS

WO    WO 2011/054082 A1    5/2011    ............. G01S 19/44

* cited by examiner

*Primary Examiner* — Dao Linda Phan
(74) *Attorney, Agent, or Firm* — Kusner & Jaffe

(57) ABSTRACT

A positioning signal from a satellite positioning system is received at a mobile station, correction information from a reference station is used, a pseudo distance observation formula using a code and a phase distance observation formula using a carrier wave are used to perform positioning using single frequency at the mobile station, and these observation formulas are expressed by a satellite clock error, clock errors at the reference station and the mobile station, a ionospheric delay and a tropospheric delay, and a code bias and a phase bias of single frequency at the reference station, the mobile station and a satellite.

2 Claims, 5 Drawing Sheets

POSITIONING METHOD AND POSITIONING APPARATUS USING SATELLITE POSITIONING SYSTEM

FIELD OF THE INVENTION

The present invention relates to a positioning method and a positioning apparatus using a satellite positioning system.

BACKGROUND OF THE INVENTION

In recent years, a global navigation satellite system (GNSS) is used to specify a three-dimensional position on the earth. While this GNSS involves point positioning with low accuracy and relative positioning with high accuracy, recently, a scheme with high accuracy has been proposed also in point positioning.

While this positioning scheme uses two radio waves for signal transportation used in the GNSS, that is, dual frequency to thereby measure a distance between a satellite and an observatory station, that is, a mobile station, with high accuracy, this positioning scheme has a drawback that a positioning apparatus using dual frequency becomes expensive. Therefore, a positioning method for enabling point positioning using a single frequency has been proposed. This positioning method is based on an RTK (Real Time Kinematic) positioning scheme and requires a reference station to be located in the vicinity of the mobile station (see, for example, WO 2011/054082 A1).

By the way, in the case of the RTK positioning scheme, when a distance between the reference station and the mobile station exceeds a few kilometers, a delay error due to the ionosphere and a delay error due to the troposphere between the reference station and the mobile station become large, making it impossible to obtain ambiguity. That is, it becomes impossible to perform positioning with an accuracy of centimeters. Typically, when the distance exceeds 5 kilometers, it is impossible to solve ambiguity with the RTK positioning scheme using single frequency. That is, the positioning scheme requiring determination of ambiguity, disadvantageously requires an expensive dual frequency GNSS receiver.

DISCLOSURE OF THE INVENTION

Therefore, an object of the present invention is to provide a positioning method and a positioning apparatus using a satellite positioning system, capable of performing positioning with high accuracy using an inexpensive single frequency receiver even when a mobile station is far from a reference station.

In order to achieve the object, a positioning method using a satellite positioning system according to the present invention is a method for performing positioning of a mobile station using single frequency of a positioning radio wave while receiving the positioning radio wave from a satellite positioning system and correction information from a reference station side, the positioning method including, estimating parameters of a satellite clock error, a satellite code bias and a satellite phase bias of single frequency, a ionospheric delay and a tropospheric delay at the reference station side, determining carrier phase ambiguity and obtaining a distance between the satellite and the mobile station, after estimating, at the mobile station, a pseudo distance using a code, a distance caused by a clock error, a phase bias of at least single frequency and the carrier phase ambiguity, by using each of the estimated parameters, and the ionospheric delay and the tropospheric delay at the mobile station, each delay at the mobile station obtained using an interpolation method based on a distance from the reference station to the mobile station and the delay at the reference station side, wherein, a pseudo distance observation formula using a code is used and a phase distance observation formula using a carrier wave is used, the pseudo distance observation formula is expressed by the satellite clock error, a receiving station clock error, the ionospheric delay and the tropospheric delay in a distance between a receiving station and the satellite, the receiving station being one of the reference station and the mobile station receiving the positioning radio wave, and code biases at the receiving station and the satellite, and the phase distance observation formula is expressed by the satellite clock error, the receiving station clock error, the ionospheric delay, the tropospheric delay and the carrier phase ambiguity in the distance between the receiving station receiving the positioning radio wave and the satellite, and phase biases at the receiving station and the satellite.

Further a positioning apparatus according to the present invention is an apparatus executing a positioning method at a mobile station using the satellite positioning system, the positioning apparatus including a distance observing unit configured to receive a positioning radio wave from a satellite to observe a pseudo distance using a code and a phase distance using a carrier wave, a correction information acquiring unit configured to acquire correction information such as a satellite orbit transmitted from a reference station side, a satellite clock error, a ionospheric delay and a tropospheric delay at the reference station side, a delay calculating unit configured to receive the correction information from the correction information acquiring unit as input to calculate the ionospheric delay and the tropospheric delay at the mobile station, a position estimating unit configured to receive the pseudo distance, the phase distance, the ionospheric delay and the tropospheric delay as input to estimate a position of the mobile station and a single difference ambiguity, an ambiguity determining unit configured to receive the single difference ambiguity estimated at the position estimating unit as input to determine single difference ambiguity, and a position determining unit configured to receive the single difference ambiguity determined at the ambiguity determining unit as input to determine the position of the mobile station, wherein, when the positioning is performed, a pseudo distance observation formula using a code and a phase difference observation formula using a carrier wave are used, the pseudo distance observation formula is expressed by the satellite clock error, a receiving station clock error, the ionospheric delay and the tropospheric delay in a distance between a receiving station and the satellite, the receiving station being one of the reference station and the mobile station receiving the positioning radio wave, and single frequency code biases at the receiving station and the satellite, and the phase distance observation formula is expressed by the satellite clock error, the receiving station clock error, the ionospheric delay, the tropospheric delay and carrier phase ambiguity in the distance between the receiving station receiving the positioning radio wave and the satellite, and single frequency phase biases at the receiving station and the satellite.

According to the positioning method and the positioning apparatus, because the pseudo distance observation formula using the code and the phase distance observation formula using the carrier wave are used as observation formulas, these observation formulas are expressed by the code bias and the phase bias, the code bias and the phase bias at the satellite side are estimated in the reference station network and these biases are transmitted to the mobile station, it is possible to estimate the phase bias using an observation formula using single frequency at the mobile station, so that it is possible to determine the carrier phase ambiguity even when a single frequency receiver is used. In other words, it is possible to perform positioning with high accuracy even with an inexpensive single frequency receiver.

A number of features and advantages of the present invention will be apparent from an embodiment described below based on accompanying drawings.

DESCRIPTION OF THE EMBODIMENT

A positioning method and a positioning apparatus using a satellite positioning system according to an embodiment of the present invention will be described below.

In this embodiment, a case will be described where a global navigation satellite system (hereinafter, abbreviated as "GNSS") is employed as the satellite positioning system.

In this positioning method, to perform positioning with an accuracy of centimeters using a low cost single frequency GNSS receiver, correction information necessary for solving carrier phase ambiguity at a mobile station is generated in a reference station network (the number of reference stations may be one, and also collectively referred as "a reference station side") made up of a plurality of reference stations and transmitted to the mobile station (also referred to as an "observatory station", an "observation point"). Hereinafter, the GNSS receiver will be simply referred to as a receiver. It should be noted that the carrier phase ambiguity is an integer value portion of a phase at the time when reception is started at the receiver. Further, the reference stations and the mobile station can be collectively referred to as a receiving station. Still further, any station can be employed as the reference station if the station can create correction information, and, for example, the reference station can be also referred to as a referential station.

Figure 1:
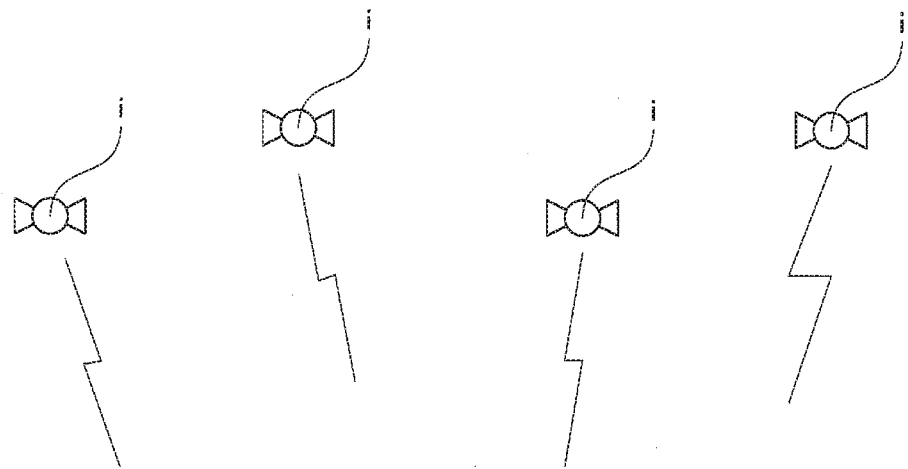
FIG. 1 is a schematic diagram illustrating arrangement relationship between a reference station network and a mobile station in a satellite positioning system for implementing an embodiment of the present invention.
Figure 1:
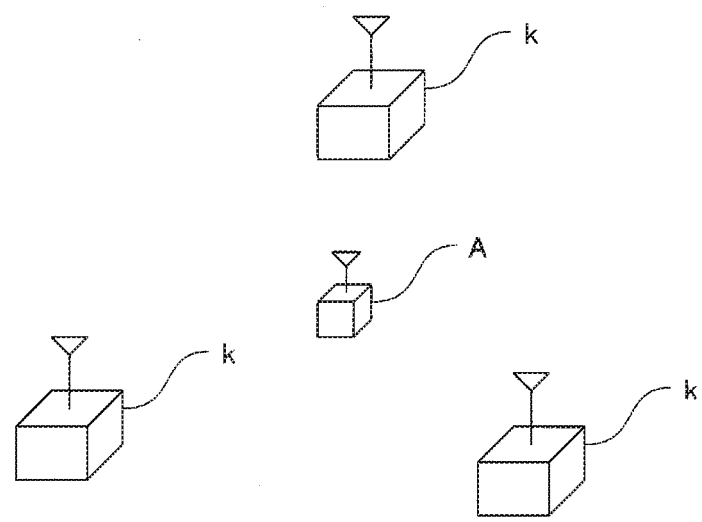

Here, a case will be described where a GPS is used as one example of the GNSS, and, as illustrated in FIG. 1, a case will be described where a mobile station A is located in an inner area of the reference station network made up of three reference stations (a reference symbol k is assigned to both the reference stations and the reference station network). In FIG. 1, a reference symbol i indicates a satellite.

Figure 2:
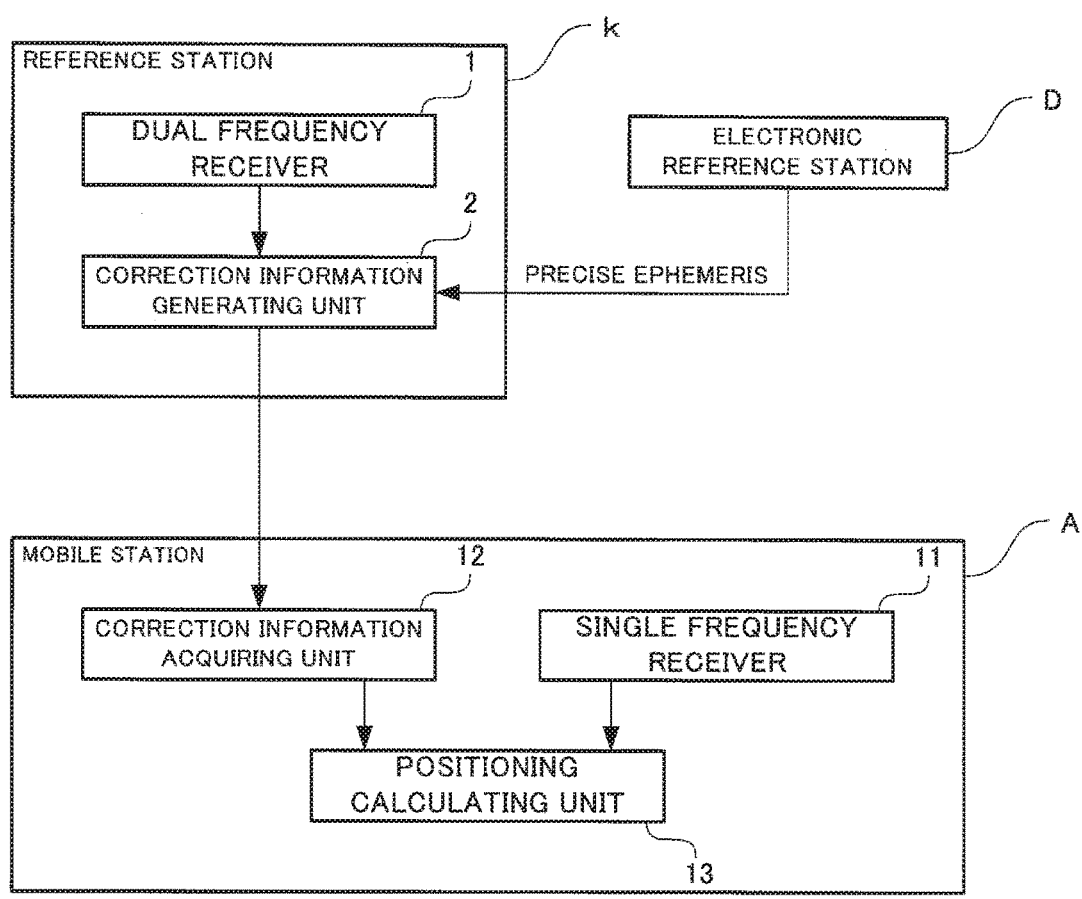
FIG. 2 is a block diagram illustrating a schematic configuration of a positioning apparatus according to the embodiment of the present invention.

First, schematic configurations of the reference station k and the mobile station A will be described based on FIG. 2.

The reference station k includes a dual frequency receiver 1 capable of receiving carrier waves of a L1 frequency (1575.42 MHz) and a L2 frequency (1227.6 MHz) and a correction information generating unit 2 configured to receive observation data of each frequency obtained at the dual frequency receiver 1 and a precise ephemeris transmitted from an electronic reference station D (ephemeris such as, for example, an IGS precise ephemeris, separately estimated based on a broadcast ephemeris) as input to generate correction information. It should be noted that the precise ephemeris includes a revised (corrected) satellite orbit and a satellite clock error. Hereinafter, a carrier wave of the L1 frequency will be referred to as an L1 wave, and a carrier wave of the L2 frequency will be referred as an L2 wave.

Further, the mobile station A includes a single frequency receiver 11 capable of receiving the L1 wave (single frequency), a correction information acquiring unit 12 acquiring the correction information generated in the reference station network k, and a positioning calculating unit 13 receiving the observation data obtained at the single frequency receiver 11 and the correction information from the correction information acquiring unit 12 as input to calculate a position of the mobile station A with high accuracy.

The correction information obtained in the reference station network (referred to as a "reference station" here) k will be described next.

At the reference station k, positioning using a code and positioning using a carrier phase using dual frequency of the L1 wave and the L2 wave are performed.

Here, an observation formula of a pseudo distance using the code expressed in the following equation (1), and an observation formula of a phase distance using the carrier wave expressed in the following equation (2) are used.

$$P^i_{fk} = \rho^i_k + c\delta_k - c\delta^i + (\lambda_f^2/\lambda_1^2)I^i_k + T_k + P_{fk} - P^i_f \tag{1}$$

$$L^i_{fk} = \rho^i_k + c\delta_k - c\delta^i - (\lambda_f^2/\lambda_1^2)I^i_k + T_k + n^i_{fk}\lambda_f + l_{fk} - l^i_f \tag{2}$$

Symbols in each equation indicate the following.

$\rho^i_k$: a geometric distance between a reference station k and a satellite i c: speed of a radio wave $\delta_k$: a reference station clock error (receiving station clock error)

$\delta^i$: a satellite clock error $I^i_k$: a ionospheric slant delay (at the reference station)

$T_k$: a tropospheric zenith delay (at the reference station)

$\lambda_f$: a wavelength of a carrier wave f $n^i_{fk}$: carrier phase ambiguity $p_{fk}$: a reference station code bias (by hardware)

$p^i_f$: a satellite code bias (by hardware)

$l_{fk}$: a reference station phase bias (by hardware)

$l^i_f$: a satellite phase bias (by hardware)

Each parameter of the satellite clock error $\delta^i$, a satellite code bias $p^i_1$ of the L1 wave, a satellite phase bias $l^i_1$ of the L1 wave, a ionospheric slant delay (delay in the eye direction) $I^i_k$ of the L1 wave and a tropospheric zenith delay (delay in the zenith direction) $T_k$ of the L1 wave are estimated by the equation (1) and equation (2). That is, the correction information is obtained. It should be noted that the code bias and the phase bias are delays at the time when signals pass circuits of equipment (hardware) such as the receiver.

A positioning method at the mobile station A will be schematically described next.

Positioning is performed using only single frequency at the mobile station A.

That is, the pseudo distance measured using a P code carried on the L1 wave (code pseudo distance) and the phase distance using the L1 wave (normally, referred to as a carrier phase) are used.

Also here, as with the case of the reference station, an observation formula of a pseudo distance using the code expressed in the following equation (3) and an observation formula (4) of a phase distance using a single frequency carrier wave (L1 wave) expressed in the following equation are used.

$$P^i_{LA} = \rho^i_A + c\delta_A - c\delta^i + I^i_A + T_A + p_{LA} - p^i_I \quad (3)$$

$$L^i_{LA} = \rho^i_A + c\delta_A - c\delta^i - I^i_A + T_A + n^i_{LA}\lambda_I + l_{LA} - l^i_I \quad (4)$$

Symbols in the equation (3) and equation (4) indicate the following.

$\rho^i_A$: a geometric distance between the mobile station A and the satellite i
c: speed of a radio wave
$\delta_A$: a mobile station clock error (receiving station clock error)
$\delta^i$: a satellite clock error
$I^i_A$: a ionospheric slant delay
$T_A$: a tropospheric zenith delay
$\lambda_I$: a wavelength of the L1 wave
$n^i_{LA}$: carrier phase ambiguity of the L1 wave
$p_{LA}$: a mobile station code bias of the L1 wave (by hardware)
$p^i_I$: a satellite code bias of the L1 wave (by hardware)
$l_{LA}$: a mobile station phase bias of the L1 wave (by hardware)
$l^i_I$: a satellite phase bias of the L1 wave (by hardware)

It should be noted that values transmitted from the reference station k are used for a distance $c\delta^i$ caused by the satellite clock error, the satellite code bias $p^i_I$ of the L1 wave and the satellite phase bias $l^i_I$ of the L1 wave. Further, the mobile station code bias $p_{LA}$ is regarded as zero.

At the mobile station A, each parameter such as the code pseudo distance $\rho^i A$, the clock error distance $c\delta_A$, the mobile station phase bias $l_{LA}$ of the L1 wave and the carrier phase ambiguity $n^i_{LA}$ of the L1 wave is estimated using a Kalman filter.

Figure 3:
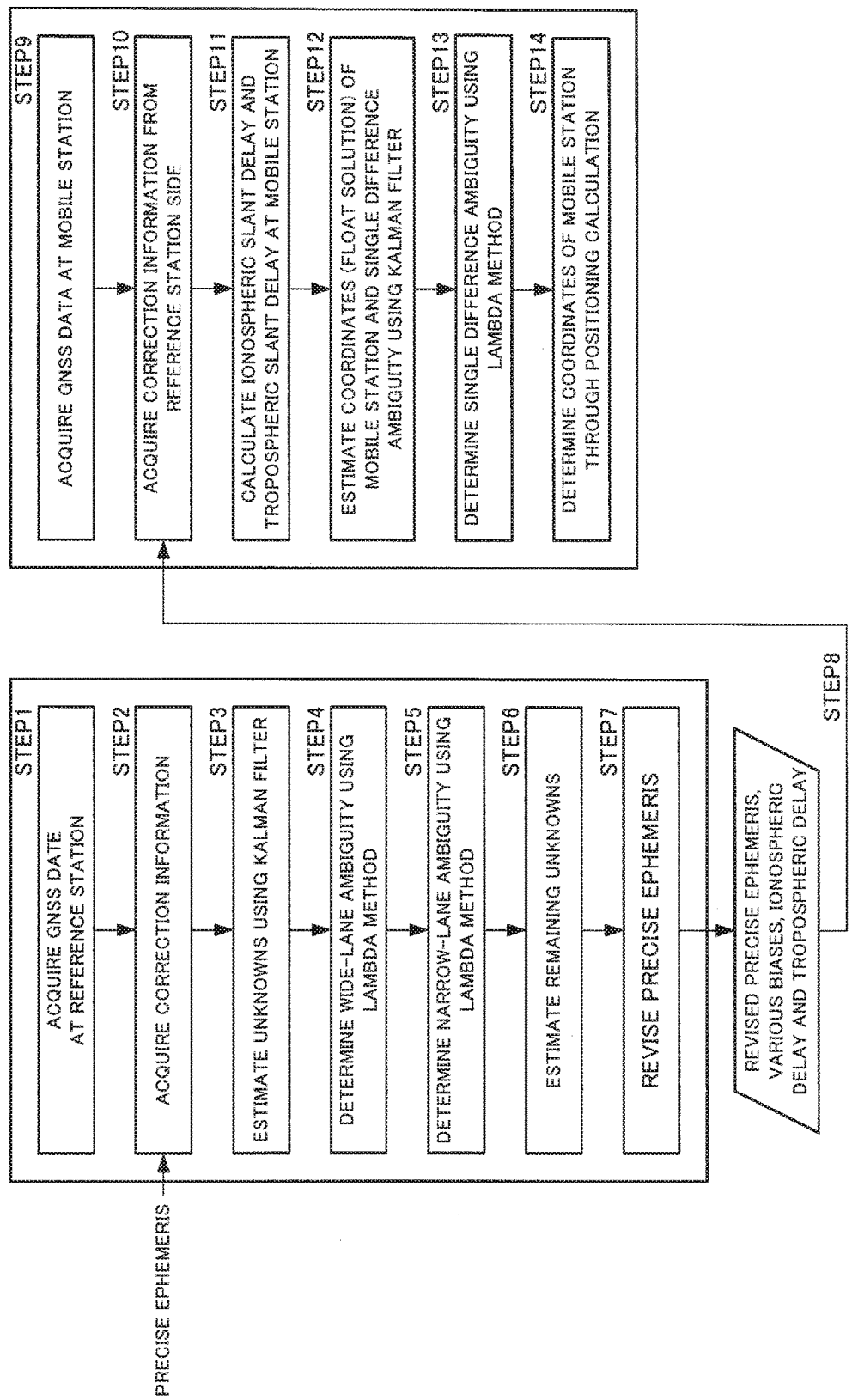
FIG. 3 is a flowchart illustrating procedure of a positioning method according to the embodiment of the present invention.

The positioning method according to the present invention will be described in detail below based on the flowchart in FIG. 3.

A. Generation procedure of correction information at the reference station side (reference station network) and estimation procedure of parameters will be described.

First, the code pseudo distance between each reference station k and the satellite i and the carrier phase (distance) of the L1 wave and the L2 wave are acquired from observation data of the reference station network k (step 1).

Next, satellite orbit information and the satellite clock error are acquired from a precise ephemeris (forecast value) transmitted from the electronic reference station D (step 2).

Next, unknowns such as the ionospheric slant delay $I^i_k$ and the tropospheric zenith delay $T_k$ are estimated using the Kalman filter while the carrier phases of the L1 wave and the L2 wave are maintained at a zero difference (values as they are, that is, raw values) (step 3).

Next, wide-lane ambiguity is determined using linear coupling of L1 and L2 step 4).

Next, narrow-lane ambiguity is determined using linear coupling of L1 and L2 (step 5).

It should be noted that a LAMBDA method (Least-square Ambiguity Decorrelation Adjustment Method) is used to determine the wide-lane ambiguity and the narrow-lane ambiguity.

Carrier phase ambiguity of linear coupling of L1 and L2 is determined from the wide-lane ambiguity and the narrow-lane ambiguity.

Next, the carrier phase ambiguity of linear coupling of L1 and L2 is returned to zero-difference ambiguity, and the Kalman filter is applied to the observation data, so that remaining unknown parameters described below are estimated (step 6).

That is, a revised value $\Delta\delta^i$ of the satellite clock error, the satellite code bias $p^i_I$ of the L1 wave, and the satellite phase bias $l^i_I$ of the L1 wave are estimated. This revised satellite clock error $\Delta\delta^i$ is used in place of the satellite clock error of the precise ephemeris (step 7).

The revised value of the satellite clock error (hereinafter, referred to as a "revised satellite clock error") $\Delta\delta^i$, and the satellite code bias $p^i_I$ of the L1 wave, the satellite phase bias $l^i_I$, the ionospheric slant delay $I^i_k$, and an estimated tropospheric zenith delay $\Delta_k$ obtained using the Kalman filter, are transmitted to the mobile station A as the correction information (step 8).

B. Measurement procedure at the mobile station which is an observation point will be described.

First, the code pseudo distance and the carrier phase (distance) are acquired from the observation data of the mobile station A (step 9).

Then, the correction information transmitted from the reference station network k, that is, the satellite orbit, the revised satellite clock error, the satellite code bias of the L1 wave, the satellite phase bias of the L1 wave, the tropospheric zenith delay, the ionospheric slant delay, and the like, are acquired (step 10).

Then, the ionospheric slant delay and the tropospheric zenith delay are obtained using the interpolation method using a triangle irregular network (TIN) (described later) (step 11).

Then, the carrier phase (distance) of the L1 wave and the code pseudo distance are maintained at a zero difference, and the mobile station phase bias of the L1 wave, the position (coordinates as a float solution) of the mobile station A and single difference ambiguity are estimated using the Kalman filter (step 12).

Then, the single difference ambiguity is determined as an integer value using the LAMBDA method (step 13).

Before the ambiguity is obtained using the LAMBDA method, the zero difference ambiguity is converted into single difference (inter-satellite) ambiguity. This single difference ambiguity is expressed in the following equation (5) if two satellites are set as (i, j).

$$n^{ij}_{LA} = n^i_{LA} - n^j_{LA} \quad (5)$$

It should be noted that the single difference ambiguity is handled as a parameter independent from (not correlated with) the estimated mobile station clock error $\delta_A$ and the estimated mobile station phase bias $l_{LA}$.

The position (three-dimensional coordinates) of the mobile station A is determined using the determined single difference ambiguity and other parameters (step 14).

C. Here, a way of obtaining the ionospheric slant delay and the tropospheric zenith delay will be described.

Figure 4:
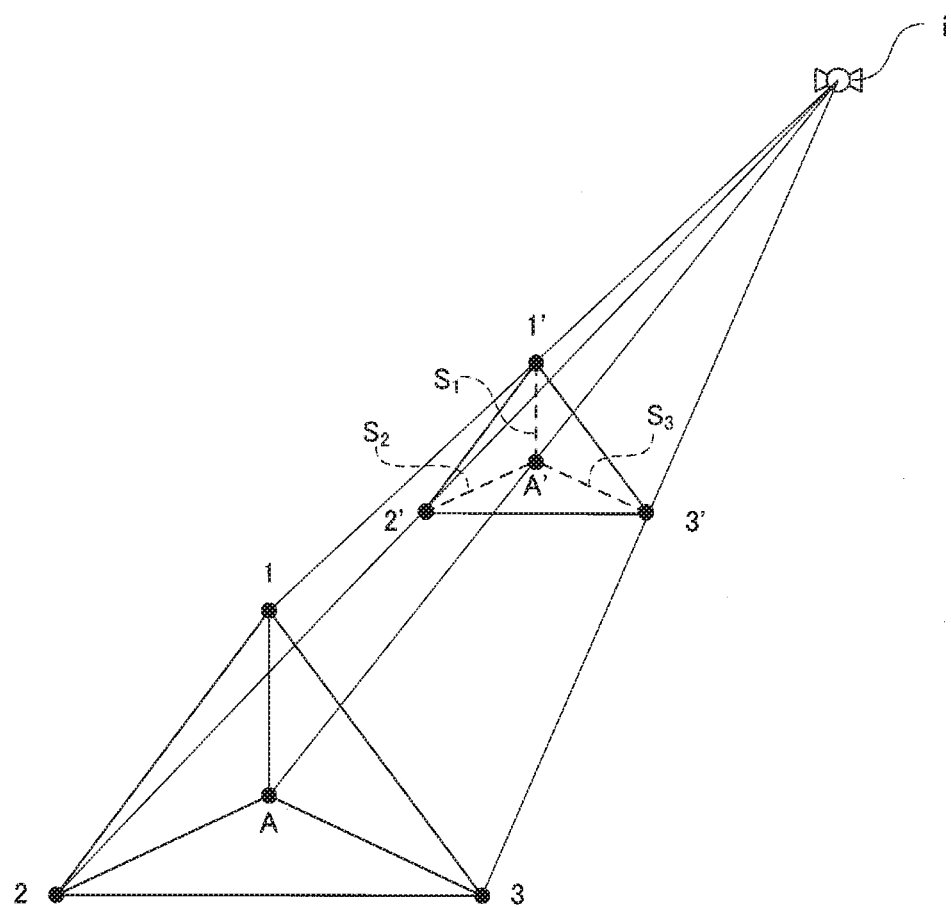
FIG. 4 is a schematic diagram explaining a ionospheric delay in the positioning method.

(1) The way of obtaining the ionospheric slant delay will be described based on FIG. 4.

The ionospheric slant delay is obtained using the triangle irregular network (TIN).

First, at the mobile station A, three reference stations k (k=1, 2, 3) near the mobile station A are selected so that the mobile station A is located inside the reference stations k.

Then, because the position (orbit) of the satellite i is known, piercing points (1', 2', 3') of the ionosphere from these three reference stations k to the satellite i are obtained. It should be noted that these piercing points (1', 2', 3') are intersection points of lines connecting the satellite i and the reference stations (to be exact, receivers) k and a bottom face of the ionosphere (also referred to as an ionosphere curved layer). Then, when the ionospheric slant delay at the respective reference stations k are set as $I_1$, $I_2$, $I_3$, because the ionospheric slant delay $I_A$ at the mobile station A can be regarded as the same as the value at the bottom face of the ionosphere, the ionospheric delay $I_A$ can be obtained using the interpolation method based on the piercing points (1', 2', 3') at the bottom face of the ionosphere.

That is, when the piercing point at the bottom face of the slant ionosphere (ionosphere in the eye direction) of the mobile station A is set as A', and distances from the piercing point A' to the piercing points (1', 2', 3') in the eye direction of the respective reference stations k are set as $S_1$, $S_2$, $S_3$, the ionospheric slant delay $I_{A'}$ at the piercing point A' of the mobile station A can be obtained as expressed in the following equation (6) using the interpolation method in inverse proportion to the distance.

$$I_{A'} = (I_1/S_1 + I_2/S_2 + I_3/S_3)/(1/S_1 + 1/S_2 + 1/S_3) \quad (6)$$

(2) The way of obtaining the tropospheric zenith delay be described.

The tropospheric zenith delay $T_k$ at the reference station k can be given by the following equation (7).

$$T_k = T^0_k + \Delta_k \quad (7)$$

In the equation (7), $T^0_k$ is an initial value of the tropospheric zenith delay, and, for example, is given from a troposphere model or outside. Specifically, $T^0_k$ is obtained based on latitude, altitude, and the like. $\Delta_k$ is a difference from the initial value of the tropospheric zenith delay is estimated using, for example, the Kalman filter.

The tropospheric zenith delay $T_A$ at the mobile station A can be given by the following equation (8).

$$T_A = T^0_A + \Delta_A \quad (8)$$

In the equation (8), $T^0_A$ can be obtained from the troposphere model, and $\Delta_A$ can be obtained using the triangle irregular network (TIN) as with the case of the ionospheric slant delay.

That is, $\Delta_A$ can be obtained the interpolation method in inverse proportion to the distance S from the tropospheric slant delay $T_k$ ($T_1$, $T_2$, $T_3$) in each reference station k (=1, 2, 3) as expressed in the following equation (9).

$$\Delta_A = (T_1/S_1 1 + T_2/S_2 + T_3/S_3)/(1/S_1 + 1/S_2 + 1/S_3) \quad (9)$$

Here, a configuration of the positioning apparatus executing the positioning method will be described.

Figure 5:
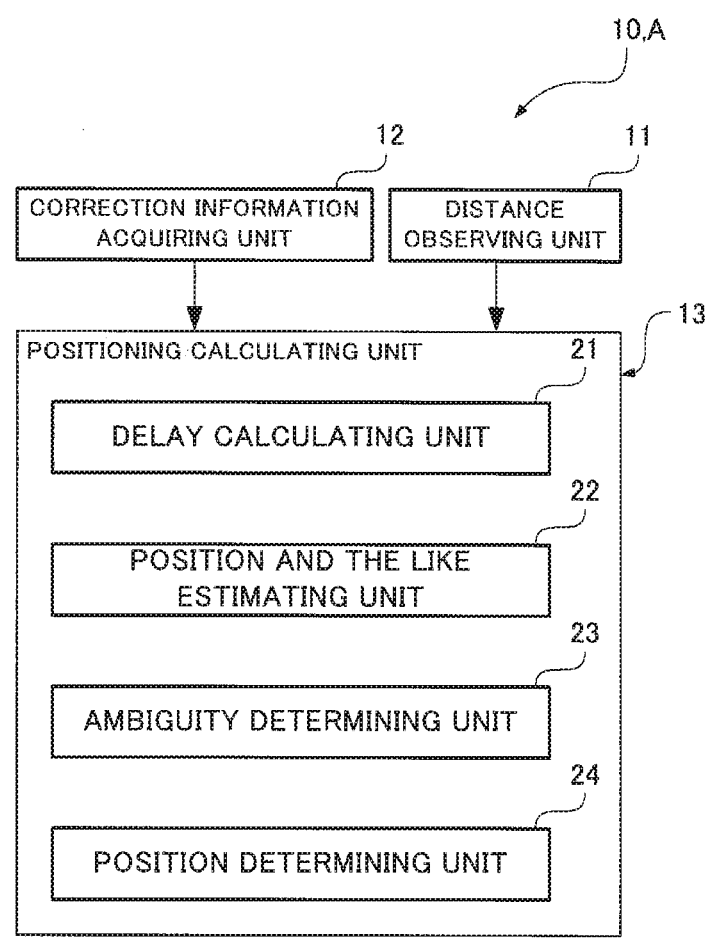
FIG. 5 is a block diagram illustrating a schematic configuration of a mobile station in the positioning apparatus.

That is, as illustrated in FIG. 5, the positioning apparatus 10 (which is also the mobile station A) is an apparatus receiving a positioning radio wave from the a global navigation satellite system at the mobile station A to perform positioning using single frequency at the mobile station A using correction information from the reference station network (reference station side) k, the positioning apparatus 10 including a distance observing unit 11 which is a single frequency receiver configured to receive the positioning radio wave from the satellite i to observe a pseudo distance using a code and a phase distance using a carrier wave, a correction information acquiring unit 12 configured to acquire a correction information such as the revised satellite orbit transmitted from the reference station network k, the revised satellite clock error, and the ionospheric delay and the tropospheric delay in the reference station network k, a delay calculating unit 21 configured to receive the correction information from the correction information acquiring unit 12 as input to calculate the ionospheric delay and the tropospheric delay at the mobile station A, a position estimating unit 22 configured to receive the pseudo distance using the code, the phase distance using the carrier wave, the ionospheric delay and the tropospheric delay as input to estimate a phase bias at the mobile station A, the position of the mobile station A and single difference ambiguity using the Kalman filter, an ambiguity determining unit 23 configured to receive the single difference ambiguity estimated at the position estimating unit 22 as input to determine single difference ambiguity, and a position determining unit 24 configured to receive the single difference ambiguity determined at the ambiguity determining unit 23 as input to determine the position of the mobile station A, wherein, when performing the positioning, the positioning apparatus 10 uses a pseudo distance observation formula using a code and a phase distance observation formula using a carrier wave, the pseudo distance observation formula expressed by the satellite clock error, the receiving station clock error, the ionospheric delay and the tropospheric delay in a geometric distance between the receiving station and the satellite, the receiving station being is one of the reference station and the mobile station receiving the positioning radio wave, and single frequency code biases at the receiving station and the satellite, and the phase distance observation formula is expressed by the satellite clock error, the receiving station clock error, the ionospheric delay, the tropospheric delay and the carrier phase ambiguity in the geometric distance between the receiving station receiving the positioning radio wave and the satellite, and single frequency phase biases at the receiving station and the satellite.

It should be noted that at the positioning calculating unit 13, the delay calculating unit 21, the positioning estimating unit 22, the ambiguity determining unit 23 and the positioning determining unit 24 are provided.

As described above, because the code bias and the phase bias at the satellite side are obtained in the reference station network, and these biases are transmitted to the mobile station as correction information, it is possible to determine ambiguity at a single frequency receiver.

That is, because the pseudo distance observation formula using the code and the phase distance observation formula using the carrier wave are used as the observation formulas, these observation formulas are made to take into account the code bias and the phase bias, the code bias and the phase bias at the satellite side are estimated in the reference station network, and these biases are transmitted to the mobile station, it is possible to estimate at least a phase bias in an observation formula using single frequency at the mobile station, so that, even when a single frequency receiver is used, it is possible to determine carrier phase ambiguity. In other words, it is possible to perform positioning with high accuracy even with an inexpensive single frequency receiver.

What is claimed is:

1. A method for performing positioning of a mobile station using single frequency of a positioning radio wave while receiving the positioning radio wave from a satellite positioning system and correction information from a reference station side, the method comprising:

estimating parameters of a satellite clock error, a satellite code bias and a satellite phase bias of single frequency, a ionospheric delay and a tropospheric delay at the reference station side;

determining carrier phase ambiguity and obtaining a distance between a satellite and the mobile station, after estimating, at the mobile station, a pseudo distance using a code, a distance caused by a clock error, a phase bias of at least single frequency and the carrier phase ambiguity, by using each of the estimated parameters, and the ionospheric delay and the tropospheric delay at the mobile station, each delay at the mobile station obtained using an interpolation method based on a distance from the reference station to the mobile station and the delay at the reference station side;

wherein a pseudo distance observation formula using a code is used and a phase distance observation formula using a carrier wave is used, the pseudo distance observation formula is expressed by the satellite clock error, a receiving station clock error, the ionospheric delay and the tropospheric delay in a distance between a receiving station and the satellite, the receiving station being one of the reference station and the mobile station receiving the positioning radio wave, and code biases at the receiving station and the satellite, and the phase distance observation formula is expressed by the satellite clock error, the receiving station clock error, the ionospheric delay, the tropospheric delay and the carrier phase ambiguity in the distance between the receiving station receiving the positioning radio wave and the satellite, and phase biases at the receiving station and the satellite.

2. An apparatus executing the positioning method at a mobile station using the satellite positioning system according to claim 1, the apparatus comprising:

a distance observing unit configured to receive a positioning radio wave from a satellite to observe a pseudo distance using a code and a phase distance using a carrier wave;

a correction information acquiring unit configured to acquire correction information such as a satellite orbit transmitted from a reference station side, a satellite clock error, a ionospheric delay and a tropospheric delay at a reference station side;

a delay calculating unit configured to receive the correction information from the correction information acquiring unit as input to calculate the ionospheric delay and the tropospheric delay at the mobile station;

a position estimating unit configured to receive the pseudo distance, the phase distance, the ionospheric delay and the tropospheric delay as input to estimate a position of the mobile station and single difference ambiguity;

an ambiguity determining unit configured to receive the single difference ambiguity estimated at the position estimating unit as input to determine single difference ambiguity; and a position determining unit configured to receive the single difference ambiguity determined at the ambiguity determining unit as input to determine the position of the mobile station, wherein, when the positioning is performed, a pseudo distance observation formula using a code and a phase distance observation formula using a carrier wave are used, the pseudo distance observation formula is expressed by the satellite clock error, a receiving station clock error, the ionospheric delay and the tropospheric delay in a distance between a receiving station and the satellite, the receiving station being one of the reference station and the mobile station receiving a positioning radio wave, and single frequency code biases at the receiving station and the satellite, and the phase distance observation formula is expressed by the satellite clock error, the receiving station clock error, the ionospheric delay, the tropospheric delay and carrier phase ambiguity in the distance between the receiving station receiving the positioning radio wave and the satellite, and single frequency phase biases at the receiving station and the satellite.

* * * * *